United States Patent
Sung et al.

(10) Patent No.: US 11,151,565 B2
(45) Date of Patent: Oct. 19, 2021

(54) IDENTITY VERIFICATION CIRCUIT AND SYSTEM THEREOF

(71) Applicant: SAMTON INTERNATIONAL DEVELOPMENT TECHNOLOGY CO., LTD., Apia (WS)

(72) Inventors: Chia-Yu Sung, New Taipei (TW); Yu-Chuan Jian, Nantou County (TW); Yu-Chang Jian, Nantou County (TW); Yi-Fen Tsui, New Taipei (TW)

(73) Assignee: SAMTON INTERNATIONAL DEVELOPMENT TECHNOLOGY CO., LTD., Apia (WS)

( * ) Notice: Subject to any disclaimer, the term of this patent is extended or adjusted under 35 U.S.C. 154(b) by 689 days.

(21) Appl. No.: 13/852,499

(22) Filed: Mar. 28, 2013

(65) Prior Publication Data

US 2013/0290185 A1 Oct. 31, 2013

(30) Foreign Application Priority Data

Apr. 25, 2012 (TW) ................................. 101114614

(51) Int. Cl.
*G06Q 20/40* (2012.01)
*G06F 21/32* (2013.01)

(52) U.S. Cl.
CPC ....... *G06Q 20/40145* (2013.01); *G06F 21/32* (2013.01); *G06F 2221/2115* (2013.01); *G06Q 2220/00* (2013.01)

(58) Field of Classification Search
USPC .......................................................... 705/64
See application file for complete search history.

(56) References Cited

U.S. PATENT DOCUMENTS 7,155,416 B2 * 12/2006 Shatford ................. G06F 21/32
705/64
7,564,997 B2 * 7/2009 Hamid ............... G06K 9/00067
340/5.53

(Continued)

FOREIGN PATENT DOCUMENTS

KR 101297118 B1 * 8/2013
TW I357752 1/2010

OTHER PUBLICATIONS

Feng Hao, R. A. (Sep. 2006). Combining Crypto with Biometrics Effectively. 55, 9. IEEE Transaction on Computers. Retrieved from https://ieeexplore.ieee.org/stamp/stamp.jsp?tp=&arnumber= 1668036 (Year: 2006).*

(Continued)

*Primary Examiner* — El Mehdi Oussir
(74) *Attorney, Agent, or Firm* — Muncy, Geissler, Olds & Lowe, P.C.

(57) ABSTRACT

Disclosed are a real and virtual identity verification circuit, a system thereof and an electronic transaction method. The circuit is capable of being built in or connected with an electronic device to allow a user to carry out electronic identity verification with his or her unique biological characteristic on a remote server. The real and virtual identity verification circuit comprises a memory unit, an acquisition unit, a processing unit and a communication unit. A verification key code is stored by the memory unit. The acquisition unit acquires the biological characteristic and generates a corresponding biological characteristic code. The processing unit processes the verification key code and the biological characteristic code according to a deal process to generate a corresponding unverified code, and the communication unit transmits the unverified code to the (Continued)

server and awaits a verification result of the electronic identity verification.

4 Claims, 4 Drawing Sheets

(56) References Cited

U.S. PATENT DOCUMENTS

| | | | | |
|---|---|---|---|---|
| 7,809,169 B2* | 10/2010 | Martinez | ............. | G06Q 20/367 235/379 |
| 2004/0133787 A1* | 7/2004 | Doughty | ............. | G06Q 20/327 713/186 |
| 2005/0154924 A1* | 7/2005 | Scheidt | ............. | G06Q 20/3674 726/19 |
| 2005/0235148 A1* | 10/2005 | Scheidt | ............. | G06F 21/6245 713/168 |
| 2006/0016871 A1* | 1/2006 | Bonalle | ............. | G06F 21/32 235/380 |
| 2006/0200427 A1* | 9/2006 | Morrison | ............. | G07C 9/257 705/67 |
| 2006/0224456 A1* | 10/2006 | Walker | ............. | G06Q 30/02 705/14.1 |
| 2006/0237529 A1* | 10/2006 | Kelley | ............. | G06Q 20/341 235/380 |
| 2007/0067833 A1* | 3/2007 | Colnot | ............. | H04L 9/3271 726/9 |
| 2007/0118891 A1* | 5/2007 | Buer | ............. | G06Q 20/24 726/8 |
| 2007/0220273 A1* | 9/2007 | Campisi | ............. | G06K 9/00006 713/186 |
| 2007/0245158 A1* | 10/2007 | Giobbi | ............. | G06F 21/31 713/186 |
| 2007/0250920 A1* | 10/2007 | Lindsay | ............. | G06F 21/31 726/7 |
| 2009/0172402 A1* | 7/2009 | Tran | ............. | G06Q 20/102 713/170 |
| 2009/0203355 A1* | 8/2009 | Clark | ............. | G06F 21/32 455/411 |
| 2009/0228300 A1* | 9/2009 | Hamel | ............. | G06Q 30/0185 705/2 |
| 2009/0292641 A1* | 11/2009 | Weiss | ............. | G06F 21/32 705/66 |
| 2010/0030696 A1* | 2/2010 | Naccache | ............. | G06F 21/305 705/71 |
| 2011/0125613 A1* | 5/2011 | Franchi | ............. | G06Q 20/4014 705/27.1 |
| 2011/0184867 A1* | 7/2011 | Varadarajan | ............. | G06Q 20/04 705/44 |
| 2011/0191250 A1* | 8/2011 | Bishop | ............. | G06Q 20/027 705/67 |
| 2011/0264919 A1* | 10/2011 | Pizano | ............. | H04L 63/0861 713/186 |
| 2013/0066786 A1* | 3/2013 | Joyce | ............. | G06Q 20/12 705/71 |
| 2013/0081145 A1* | 3/2013 | Pitt | ............. | G06F 21/32 726/27 |
| 2014/0229388 A1* | 8/2014 | Pereira | ............. | G06Q 20/38215 705/76 |
| 2015/0106621 A1* | 4/2015 | Burke | ............. | G07F 7/0893 713/168 |
| 2015/0206147 A1* | 7/2015 | Stanfield | ............. | G06Q 20/4018 705/41 |
| 2017/0200139 A1* | 7/2017 | Dabrowski | ............. | G07F 17/3209 |
| 2018/0121924 A9* | 5/2018 | Johnson | ............. | G06Q 20/385 |
| 2018/0158278 A1* | 6/2018 | Dabrowski | ............. | G07F 17/3244 |

OTHER PUBLICATIONS

Murillo-Escobar, M., et al. (2015). A robust embedded biometric authentication system based on fingerprint and chaotic encryption. (42 8198-8211). Expert Systems with Applications. Retrieved from https://reader.elsevier.com/reader (Year: 2015).*

Office Action issued by TIPO, Taiwan for case 10421266440 dated Sep. 18, 2015.

Search report issued by TIPO, Taiwan for case 101114614 dated Apr. 25, 2012.

* cited by examiner

IDENTITY VERIFICATION CIRCUIT AND SYSTEM THEREOF

CROSS-REFERENCE TO RELATED APPLICATIONS

This Application claims priority of Taiwan Patent Application No. 101114614, filed on Apr. 25, 2012, the entirety of which is incorporated by reference herein.

FIELD OF THE INVENTION

This invention relates to a real and virtual identity verification circuit, a system comprising the same and an electronic transaction method, capable of carrying out electronic identity verification with high security in a virtual environment on the Internet through the use of a user's unique biological characteristic in a real environment.

BACKGROUND OF THE INVENTION

Recently, with the growing popularity of the virtual environment established by the Internet and its penetration into the real environment of consumers, new lifestyles appear rapidly and change people's consumption habits. For example, instead of doing shopping in a real store, more and more consumers choose to make online transaction in the virtual environment, such as a shopping platform built on the Internet.

There are several reasons why virtual stores gradually replace real ones and grasp a substantial share of the market. In contrast to real stores, the virtual environment provides a low-cost sales channel to reduce considerable real store costs and personnel costs. In addition, the virtual environment provides consumers with much more flexibility, allowing them to do shopping anytime and anywhere.

However, the most important issue for consumption in the virtual environment is how to determine of consumer's identity in the real environment. Apparently, consumer's identity can be confirmed by a real identity certificate or proof of identity; however, in the virtual environment, documents are prone to alteration since they are available only in the electronic form. Accordingly, it is desirable to verify the identity of a consumer in a highly secure way in the virtual environment.

To address the above-identified problem, many solutions have been proposed. For example, consumers may first create an account representing their identity and a set of password for the account, such that they can perform operations in the virtual environment with the account and the password, such as performing electronic transaction with a credit card and the account as well as the password. Nevertheless, security may be jeopardized if the account and the password or even the credit card is hacked. Another approach is to electronically verify an identity document, which is mostly used by the government agencies. For example, a certification IC card is issued upon application by a household registration office according to the applicant's unique identity, and the certification IC card may be used to represent the holder's identity. Although the electronic identity system established by the government is authoritative and reliable, the verification process may still be damaged because it uses fixed passwords. In addition, in order to maintain its security, the system adopts a closed design mostly limited to government purposes and is rarely opened to the private sector.

Furthermore, some commodities, such as lottery tickets, are not currently suitable for consumption by electronic transaction. Lottery tickets are un-inscribed value-bearing instruments, so the one who holds a lottery ticket is deemed to be its owner. Thus, the purchase of lottery tickets usually has to be done by consumers in person, making lottery transaction quite inconvenient.

Accordingly, the present invention provides a real and virtual identity verification circuit, a system comprising the same and an electronic transaction method to address the drawbacks mentioned above.

SUMMARY OF THE INVENTION

It is an object of this invention to provide a real and virtual identity verification circuit capable of being built in or connected with an electronic device to carry out highly secure electronic identity verification of a user with his or her unique biological characteristic on a remote server.

It is another object of this invention to use the above-mentioned real and virtual identity verification circuit, through the generation of a biological characteristic code associated with the unique biological characteristic of a user by several deal processes, to achieve various types of electronic identity verification.

It is another object of this invention to provide a real and virtual identity verification system for electronic identity verification, which is formed by the real and virtual identity verification circuit and the server.

It is still another object of this invention to provide an electronic transaction method realizing highly secure electronic transaction in the real environment through the virtual environment based on the verification result of electronic identity verification performed by the real and virtual identity verification system.

These and other objects are accomplished by a real and virtual identity verification circuit capable of being built in or connected with an electronic device to allow a user to carry out electronic identity verification with his or her unique biological characteristic on an Internet-based server storing data associated with the biological characteristic. The real and virtual identity verification circuit comprises a memory unit, an acquisition unit, a processing unit and a communication unit. The memory unit has a storage space for storing a verification key code. The acquisition unit acquires the biological characteristic and generates a corresponding biological characteristic code. The processing unit, which is connected with the memory unit and the acquisition unit and provided with a deal process, processes the verification key code and the biological characteristic code according to the deal process to generate a corresponding unverified code. The communication unit, which is connected with the processing unit, transmits the unverified code to the Internet and awaits a verification result of the electronic identity verification associated with the unverified code from the server.

These and other objects are also accomplished by a real and virtual identity verification system enabling a user to carry out electronic identity verification with his or her unique biological characteristic. The system comprises an electronic device and a server. The electronic device comprises a memory unit, an acquisition unit, a processing unit and a communication unit, wherein the memory unit has a storage space for storing a verification key code; the acquisition unit acquires the biological characteristic and generates a biological characteristic code corresponding to the biological characteristic; the processing unit is connected with the memory unit and the acquisition unit and provided with a deal process, the processing unit processing the verification key code and the biological characteristic code according to the deal process to generate a corresponding unverified code; and the communication unit is connected with the processing unit and transmits the unverified code to the Internet. The server comprises a database unit, a transceiving unit, a verification unit, and a feedback unit, wherein the database unit stores the biological characteristic of the user; the transceiving unit receives the unverified code; the verification unit is connected with the database unit and the transceiving unit and adapted for verifying the biological characteristic and the unverified code to generate a verification result; and the feedback unit is connected with the verification unit and adapted for sending the verification result to the electronic device via the transceiving unit to complete the verification of the user's identity.

These and other objects are further accomplished by an electronic transaction method enabling a user to make an electronic transaction on at least one transaction sub-server connected with a transaction server containing an indicated link path of the transaction sub-server after the user obtains a verification result of electronic identity verification performed by a real and virtual identity verification system including an electronic device and a server with the use of a biological characteristic, the method comprising (a) connecting the electronic device to the transaction server to select the indicated link path of the transaction sub-server at the transaction server; and (b) using the electronic device to receive the verification result such that the transaction server selectively allows the user to make the electronic transaction, wherein the user is selectively enabled to carry out the electronic transaction on the transaction sub-server directly via the transaction server according to the verification result and the indicated link path.

In one embodiment, the electronic transaction is related to electronic lottery, the transaction server is a financial platform, and the transaction sub-server is a lottery vending machine.

In contrast to prior arts, the real and virtual identity verification circuit, the system thereof and the electronic transaction method enable a user to convert his or her biological characteristic into a corresponding biological characteristic code with the use of one of a plurality of deal processes, and the biological characteristic code may be used by a remote server for performing electronic identity verification of the user. In one aspect, the server is capable of confirming the consistency between the biological characteristic code and the biological characteristic stored in the server, and the verification result is then transmitted back to the real and virtual identity verification circuit to complete the electronic identity verification of the user. Accordingly, the user can make highly secure electronic transaction according to the verification result, such as buying an electronic lottery ticket in a lottery transaction mode.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

DETAILED DESCRIPTION OF THE INVENTION

Embodiments are illustrated in the accompanying figures to improve understanding of concepts, features and advantages presented by the present invention.

Figure 1:
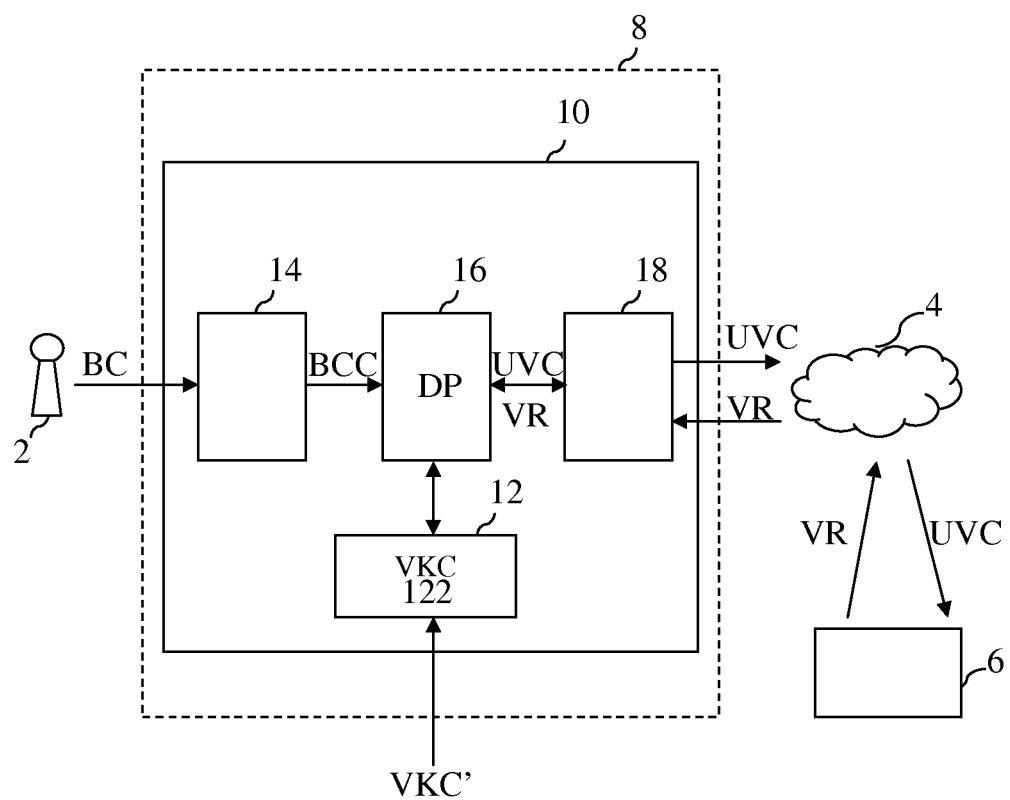
FIG. 1 illustrates a block diagram of the real and virtual identity verification circuit of one embodiment of this invention.

FIG. 1 illustrates a block diagram of the real and virtual identity verification circuit of one embodiment of this invention. The real and virtual identity verification circuit 10 enables a user 2 to perform electronic identity verification with his or her unique biological characteristic BC on a server 6 pre-storing data associated with the biological characteristic BC on the Internet 4. In one embodiment, the biological characteristic BC may be for example a fingerprint, an iris pattern, a palm print, a vein pattern, a sound pattern or a facial pattern of the user 2.

The real and virtual identity verification circuit 10 may be built in or connected with an electronic device 8. In other words, the real and virtual identity verification circuit 10 may be either embedded in an electronic device 8 or connected with an external electronic device 8. The electronic device 8 may be a portable mobile communication device, a tablet computer or a stationary personal computer. If the real and virtual identity verification circuit 10 is used externally from the electronic device 8, it may be integrated in another electronic product such as a flash drive.

In one embodiment, the real and virtual identity verification circuit 10 comprises a memory unit 12, an acquisition unit 14, a processing unit 16 and a communication unit 18.

The memory unit 12 has a storage space for storing a verification key code VKC, which is generated by any one of the following procedures:

1) the verification key code VKC corresponding to the biological characteristic BC is pre-saved in the memory unit 12;

2) the memory unit 12 is provided with the verification key code VKC which is associated with the electronic device 8, such as one of a media access control (MAC) address, a subscriber identity module (SIM) and a password of the electronic device 8 which may be flexibly set by the user;

3) the memory unit 12 receives via the communication unit 18 a variable key code VKC' generated by a third party server or the server 6 and forms the verification key code VKC, such that the variable key code VKC' allows periodic change of the verification key code VKC. For example, the variable key code VKC' is passively changed within a duration such as microsecond(s), millisecond(s), second(s), hour(s), day(s), month(s) or year(s). Alternatively, in an active replacement mode, the real and virtual identity verification circuit 10 may retrieve the variable key code VKC' from the third party server or the server 6 only when the user 2 proceeds electronic identity verification; and 4) the verification key code VKC is formed from the biological characteristic BC obtained by the acquisition unit 14 and is saved in the memory unit 12. As such, the user 2 is allowed to flexibly establish the verification key code VKC associated with the biological characteristic BC for the purpose of electronic identity verification.

The acquisition unit 14 is configured to acquire the biological characteristic BC and generate a biological characteristic code BCC corresponding to the biological characteristic BC. In one embodiment, the acquisition unit 14, such as a camera or a fingerprint recognition device, is configured to acquire, among others, a fingerprint, an iris pattern, a palm print, a vein pattern, a sound pattern or a facial pattern.

The processing unit 16 is connected with the memory unit 12 and the acquisition unit 14 and provided with a deal process DP, such that the processing unit 16 processes the verification key code VKC and the biological characteristic code BCC to generate a corresponding unverified code UVC. In one embodiment, the deal process DP is configured for any one of the following purposes:
1) the deal process DP compares the biological characteristic code BCC with the verification key code VKC to determine whether to generate the unverified code UVC;
2) the deal process DP encodes the biological characteristic code BCC and the verification key code VKC to generate the unverified code UVC corresponding to or including the biological characteristic code BCC and the verification key code VKC; and
3) the deal process DP selects the biological characteristic code BCC or the verification key code VKC to generate the unverified code UVC.

The communication unit 18 is connected with the processing unit 16 for transmitting the unverified code UVC to the Internet 4 and awaiting a verification result VR of the electronic identity verification associated with the unverified code UVC from the server 6. In one embodiment, the communication unit 18 transmits the unverified code UVC via wired or wireless communication, and the communication unit 18 is in compliance with a communication protocol of BLUETOOTH, fixed network communication, mobile communication, or WI-FI.

Figure 2:
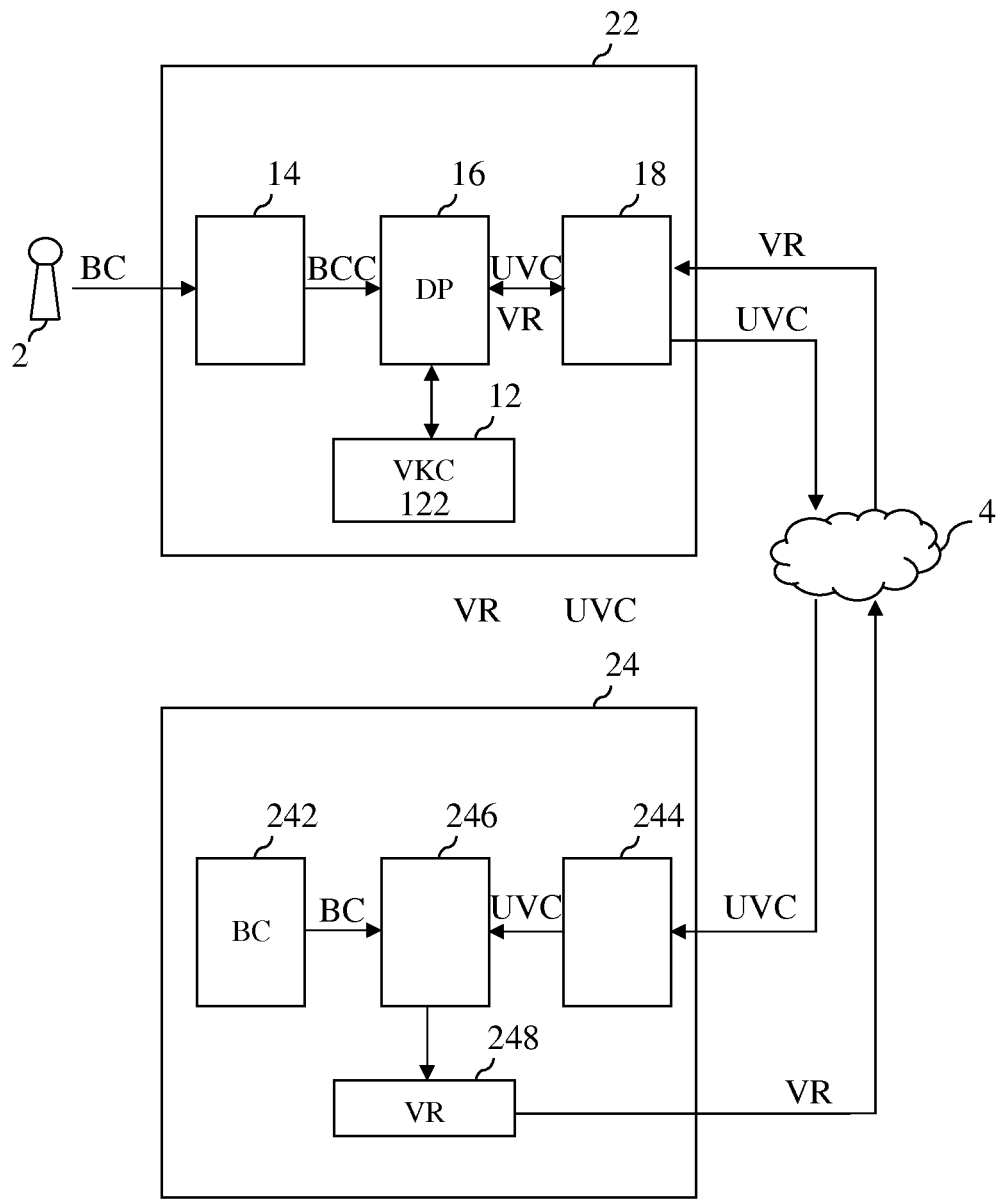
FIG. 2 illustrates a block diagram of the real and virtual identity verification system of one embodiment of this invention.

FIG. 2 illustrates a block diagram of the real and virtual identity verification system of one embodiment of this invention. The real and virtual identity verification system 20 enables the user 2 to carry out electronic identity verification with his or her unique biological characteristic BC. In this embodiment, the real and virtual identity verification system 20 comprises an electronic device 22 and a server 24.

As mentioned in the previous embodiment, the electronic device 22 is built in with the real and virtual identity verification circuit 10 comprising the memory unit 12, the acquisition unit 14, the processing unit 16 and the communication unit 18.

The server 24 comprises a database unit 242, a transceiving unit 244, a verification unit 246 and a feedback unit 248.

The database unit 242 is configured for storing the biological characteristic BC of the user 2, which may be acquired in advance and saved in the database unit 242 to complete the registration of the biological characteristic BC therein. In one embodiment, the database unit 242 is configured for storing the biological characteristic BC as a fingerprint, an iris pattern, a palm print, a vein pattern, a sound pattern or a facial pattern.

The transceiving unit 244 is configured for receiving the unverified code UVC.

The verification unit 246 is connected with the database unit 242 and the transceiving unit 244 and configured for verifying, such as by comparison, the biological characteristic BC and the unverified code UVC and determining whether the unverified code UVC matches the biological characteristic BC pre-saved in the database unit 242 to generate the verification result VR indicating the verification outcome such as matched, not matched or determination failure.

The feedback unit 248 is connected with the verification unit 246 and configured for sending the verification result VR to the electronic device 22 to complete the verification of the user's identity.

Figure 3:
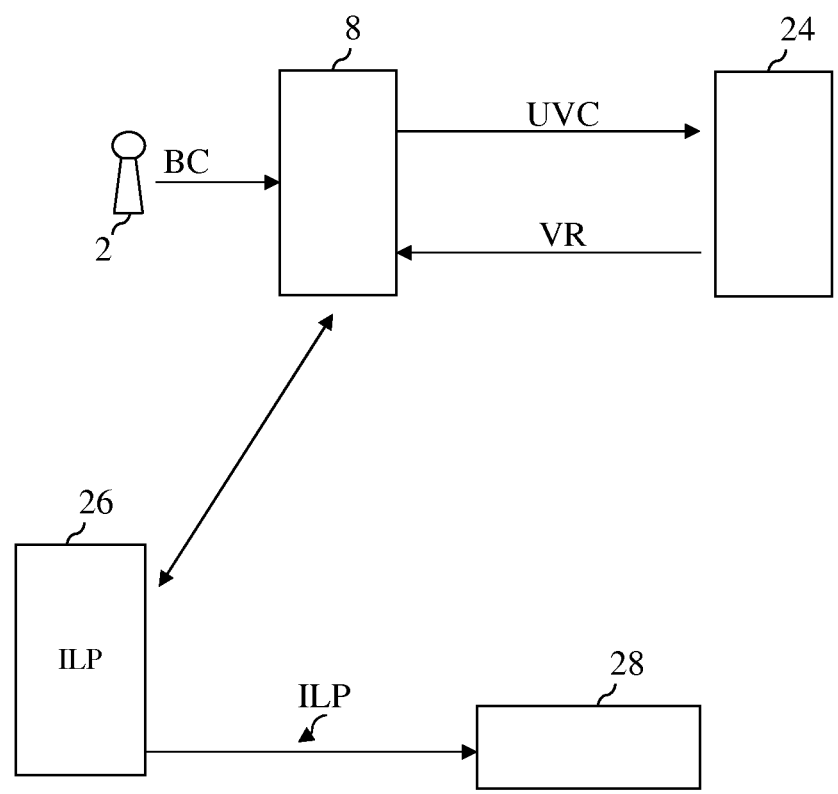
FIG. 3 illustrates a block diagram of the electronic transaction method of one embodiment of this invention.
Figure 4:
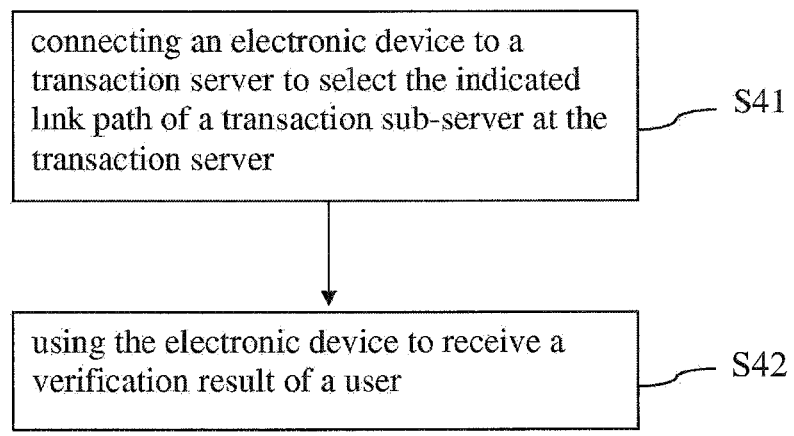
FIG. 4 illustrates a flowchart of the electronic transaction method of FIG. 3.

FIGS. 3 and 4 illustrate respectively a block diagram and a flowchart of the electronic transaction method of one embodiment of this invention. In the architecture illustration of FIG. 3, the electronic transaction method enables the user 2 to make an electronic transaction on at least one transaction sub-server 28 (e.g. a shopping website or a lottery vending machine) connected with a transaction server 26 (e.g. a bank server or a cash flow platform) containing an indicated link path ILP of the transaction sub-server 28 after the user 2 obtains a verification result VR of electronic identity verification performed by a real and virtual identity verification system including the electronic device 8 and the server 24 with the use of a biological characteristic.

In FIG. 4, the electronic transaction method begins with the step S41 for connecting the electronic device 8 to the transaction server 26 to select the indicated link path ILP of the transaction sub-server 28 at the transaction server 26.

Next, the step S42 comprises using the electronic device 8 to receive the verification result VR of the user 2 such that the transaction server 26 selectively allows the user 2 to carry out the electronic transaction, by which the user 2 is selectively enabled to make the electronic transaction on the transaction sub-server 28 directly via the transaction server 26 according to the verification result VR and the indicated link path ILP.

In one embodiment, the transaction server 26 provides the electronic device 8 with the geographical location of a transaction sub-server 28 in proximity to the electronic device 8 according to one of the geographical location of the electronic device 8 and the information related to the user 2.

In another embodiment, the electronic transaction is related to electronic lottery, the transaction server 26 is a financial platform, and the transaction sub-server 28 is a lottery vending machine.

Under the electronic transaction mode of electronic lottery, after the user 2 makes the electronic transaction on the lottery vending machine, the lottery vending machine produces a paper-based lottery ticket bearing lottery information, such as the number(s) chosen by the user 2.

In addition, the lottery information of the paper-based lottery ticket is then transmitted back to the electronic device 8 to solely allow the user 2 with the biological characteristic BC to virtually possess the paper-based lottery ticket.

In another embodiment, the transaction sub-server 28 preserves the paper-based lottery ticket and associates the biological characteristic BC of the user 2 with the paper-based lottery ticket to solely allow the user 2 with the biological characteristic BC to acquire the paper-based lottery ticket.

In addition, the user 2 is allowed to retrieve the paper-based lottery ticket from the lottery vending machine with the biological characteristic BC.

The real and virtual identity verification circuit, the system thereof and the electronic transaction method enable a user to convert his or her biological characteristic into a corresponding biological characteristic code with the use of one of a plurality of deal processes, and the biological characteristic code may be used by a remote server for performing electronic identity verification of the user. In one aspect, the server is capable of confirming the consistency between the biological characteristic code and the biological characteristic stored in the server, and the verification result is then transmitted back to the real and virtual identity verification circuit to complete the electronic identity verification of the user. Accordingly, the user can make highly secure electronic transaction according to the verification result, such as buying an electronic lottery ticket in a lottery transaction mode.

While these descriptions directly describe the above embodiments, it is understood that those skilled in the art may conceive modifications and/or variations to the specific embodiments shown and described herein. However, any such modifications or variations that fall within the scope of this description are intended to be included therein as well.

What is claimed is:

1. An identity verification system for carrying out electronic identity verification with a biological characteristic of a user, comprising:
   an electronic device comprising:
      an identity verification circuit, comprising:
         a first memory for storing a first program code; and
         a first processor connected to the first memory;
      a biological characteristics acquisition device connected to the first processor; and
      a communication device connected to the first processor and performing communication in compliance with a communication protocol,
   wherein when the first processor executes the first program code, the first processor performs operations comprising:
      acquiring the biological characteristic, wherein the biological characteristic comprises a fingerprint, an iris pattern, a palm print, a vein pattern, a sound pattern or a facial pattern,
      generating a biological characteristic code corresponding to the biological characteristic,
      receiving and storing a variable key code,
      generating an unverified code by encoding the biological characteristic code and the variable key code,
      transmitting a verification request to an authentication server, wherein the verification request comprises the unverified code, and
      receiving a verification result from the authentication server; and
   the authentication server connected to the electronic device, the authentication server comprising:
      a second memory storing a second program code;
      a second processor connected with the second memory;
      a database that stores the biological characteristic of the user; and
      a transceiving device that transmits the verification result and receives the unverified code;
   wherein when the second processor executes the second program code, the second processor performs operations comprising:
      generating the variable key code, wherein the variable key code is passively changed or actively changed, and the variable key code is passively changed within a duration,
      transmitting the variable key code to the electronic device;
      receiving the verification request from the electronic device,
      verifying the biological characteristic stored in the database and the received unverified code in response to receiving the verification request,
      generating the verification result, and
      transmitting the verification result to the electronic device.

2. The identity verification system of claim 1, wherein the variable key code is derived from at least one of a media access control address, a subscriber identity module and a password set by the user of the electronic device.

3. The identity verification system of claim 1, wherein the communication device transmits the unverified code via wired or wireless communication.

4. The identity verification system of claim 1, wherein the verification key code corresponding to the biological characteristic is pre-saved in the first memory.

* * * * *